(12) United States Patent
Brusca et al.

(10) Patent No.: US 8,085,808 B2
(45) Date of Patent: Dec. 27, 2011

(54) AUTOMATIC CONFIGURATION OF NETWORK DEVICES FOR NETWORK SERVICES

(75) Inventors: Michael Stuart Brusca, Hicksville, NY (US); Sanjay Udani, Arlington, VA (US); Agnes Benneh, Fair Lawn, NJ (US)

(73) Assignee: Verizon Services Corp., Ashburn, VA (US)

( * ) Notice: Subject to any disclaimer, the term of this patent is extended or adjusted under 35 U.S.C. 154(b) by 1124 days.

(21) Appl. No.: 11/128,034

(22) Filed: May 12, 2005

(65) Prior Publication Data

US 2006/0256813 A1     Nov. 16, 2006

(51) Int. Cl.
*H04J 3/16* (2006.01)
(52) U.S. Cl. ........ 370/466; 709/203; 709/221; 709/223; 709/230
(58) Field of Classification Search .................. 370/466; 707/102, 17.032
See application file for complete search history.

(56) References Cited

U.S. PATENT DOCUMENTS 7,043,499 B1 * 5/2006 Nelson et al. ................. 707/102
7,890,586 B1 * 2/2011 McNamara et al. .......... 709/206
2003/0046370 A1   3/2003 Courtney
2003/0208609 A1 * 11/2003 Brusca .......................... 709/230
2004/0103308 A1   5/2004 Palles
2007/0150561 A1 * 6/2007 Courtney ...................... 709/220

OTHER PUBLICATIONS

Keizo, et al Method, System, and Program for LDAP/XML Conversion, Recording Medium, and LDAP Server (Japanese Publication No. 2002-366399).*
Melcher, Brian, Mitchell, Bradley, Towards an Autonomic Framework: Self-Configuring Network Services and Developing Autonomic Applications, Intel Technology Journal, vol. 8, Issue 4, Published, Nov. 17, 2004, ISSN 1535-864X, p. 279-290, http://developer.intel.com/technology/itj.index.htm.

* cited by examiner

*Primary Examiner* — Seema S. Rao
*Assistant Examiner* — Henry Baron

(57) ABSTRACT

Systems and methods for facilitating automatic configuration of network devices for network services are disclosed. In one of many possible embodiments, a request for information for configuring a network device is received from a requesting device. The request is in a first protocol format. The information is retrieved from a directory subsystem in a second protocol format. The retrieved information is converted from the second protocol format to the first protocol format. The converted information is transmitted in the first protocol format to the requesting device in response to the request.

16 Claims, 6 Drawing Sheets

AUTOMATIC CONFIGURATION OF NETWORK DEVICES FOR NETWORK SERVICES

BACKGROUND

Through packet-switched networks, network devices are able to communicate data to and receive data from other devices. The network devices are also able access services provided by network service providers (NSPs). For example, a subscriber with a network device (e.g., a modem or a router) is able to access routine network services such as high-speed Internet access, e-mail hosting, and virtual private networks.

To enable network devices to access and receive network services from NSPs, the network devices are configured to communicate with other devices using a network communication protocol (e.g., TCP/IP or ATM). The network devices are typically equipped with instructions including one or more basic network communication protocols that enable the network devices to exchange information with other devices over packet-switched networks.

Using network communication protocols, network devices are able to locate NSPs and other devices that provide network services. Once a particular NSP is located by a network device, the network device typically requests and receives configuration information from the NSP, and the requested configuration information is used to configure the network device for a particular network service provided by the NSP. In general, such a configuration of the network device for a network service is performed automatically, thereby making the configuration process seamless and transparent to subscribers.

Asynchronous transfer mode (ATM), point-to-point protocol (PPP), and dynamic host configuration protocol (DHCP) are examples of protocols traditionally used to auto-configure network devices for routine network services, particularly for assignment of internet protocol (IP) addresses. PPP is a simple communication protocol for exchanging various types of information, including configuration information, between networked devices. PPP provides for message exchange and subscriber authentication between a network device and a single NSP. DHCP is designed to provide configuration parameters to network devices and to allocate network addresses.

While the auto-configuration mechanisms and protocols described above are sufficient for automatic configuration of routing network services, the mechanisms and protocols are limited to configuring network devices where a single NSP provides a single service. In other words, conventional auto-configuration mechanisms are only able to obtain configuration information from a specific server that represents only a single NSP. This is due at least in part to the limitations of the conventional protocols (e.g., ATM, PPP, and DHCP). In particular, conventional protocols are capable of supporting only a limited number of different network services and configuration parameters. Conventional protocols are incapable of storing complex configuration information for a large number of NSPs providing a large variety of network services.

Unfortunately, the limitations of traditional auto-configuration mechanisms and protocols render them unsuitable for supporting auto-configuration of network devices for many advanced network services. Advanced network services are typically provided by different NSPs, and each NSP may require different permanent virtual circuits (PVCs) or IP connections with different attributes that may vary according to the service being provided. In addition to multiple IP sessions, several advanced network services often require multiple PVCs or IP connections with various traffic parameters that may differ from each other, depending on the particular service, as well as on a subscriber's network device. Examples of advanced network services include video-on-demand, video conferencing, video gaming, broadcast and unicast video, audio (e.g., web radio and compact-disc quality audio), dynamic provisioning, image management, and security services such as managed firewalls, virus protection, anti-spam features, and parental controls.

Because of the demands of advanced network services and the limitations of conventional auto-configuration mechanisms and protocols, subscribers have been limited to obtaining advanced network services only from NSPs that have pre-established agreements with the network access providers (NAPs) being used to connect the subscribers to the NSPs. For example, a particular subscriber desiring video-on-demand is limited to using the NSPs that, under an agreement with the subscriber's NAP, have provided configuration information specific to their video-on-demand services.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Systems and methods for automatically configuring network devices for accessing network services are disclosed. One or more directory subsystems is provided for storing configuration information related to network services provided by network service providers. A converter is configured to interface the directories of configuration information with the network devices, namely by converting network protocol messages into directory protocol messages and vice versa. This allows network devices, including currently deployed network devices, to access configuration information for network services from central directories rather than having to obtain configuration information from one participating network service provider at a time. The configuration information is sent from the directory subsystem(s) to the requesting network devices to automatically configure the network devices for the associated network services. The present systems and methods expand auto-configuration processes so that network devices are able to gather configuration information for a large number and variety of advanced network services.

Throughout the specification and the claims, the term "configuration information" is meant to be understood broadly as any instructions useful for automatically configuring one or more network devices for network devices. Certain embodiments of the present systems and methods will now be described in detail.

I. Introduction of Elements

Figure 1:
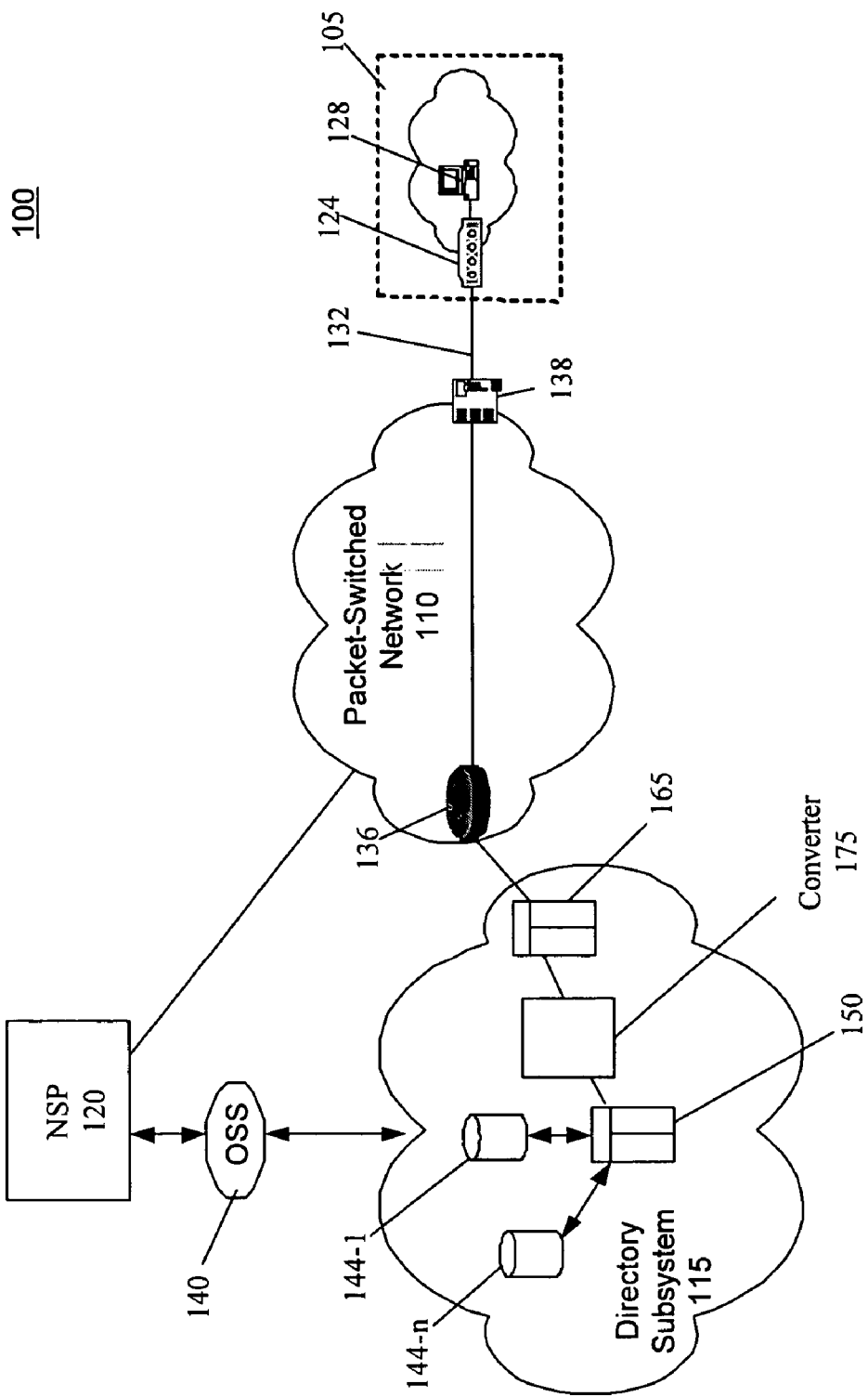
FIG. 1 is a block diagram of a system for automatically configuring network devices for network services, according to one embodiment.

FIG. 1 is a block diagram of a system 100 for automatically configuring network devices for network services, according to one embodiment. As shown in FIG. 1, customer premises equipment ("CPE") 105 is connected to a packet-switched network 110. The packet-switched network 110 is connected to a directory subsystem 115 and a network service provider ("NSP") 120. The NSP 120 and the directory subsystem 115 are also connected to each other. The connections between the customer premises equipment 105, packet-switched network 110, directory subsystem 115, and NSP 120, as shown in FIG. 1, may comprise any connection known to those skilled in the art.

In the system 100 shown in FIG. 1, the customer premises equipment 105 is able to access configuration information stored in the directory subsystem 115. The configuration information is sent to the customer premises equipment 105 to be used to automatically configure the customer premises equipment for accessing network services provided by the NSP 120. By providing the directory subsystem 115 and an interface between the directory subsystem 115 and the customer premises equipment 105, the system 100 provides the customer premises equipment 105 with access to significant amounts of configuration information, which may include complex information associated with advanced network services. The elements shown in FIG. 1, as well as their functionalities, will now be discussed in greater detail.

A. Customer Premises Equipment (CPE)

The customer premises equipment (CPE) 105 may include any known devices capable of accessing configuration information and being automatically configured for network services in accordance with the configuration information. The CPE 105 may be used to access, receive, and use data transmitted over the packet-switched network 110, including configuration information associated with network services. The CPE 105 is capable of using known network management protocols to communicate with other network devices over the packet-switched network 110.

As shown in FIG. 1, the CPE 105 may include one or more devices configured to provide a connection with the packet-switched network 110. Any known device capable of establishing one or more connections with the packet-switched network 110 may be included in the CPE 105. Merely by way of example, the CPE 105 may include the following devices for establishing connections with the packet-switched network 110: modems, broadband network terminations, servers, switches, network interface cards, premises routers, routing gateways, and the like.

In the embodiment shown in FIG. 1, a routing gateway 124 is illustrated as being part of the customer premises equipment 105. Routing gateways are well-known to those skilled in the art. The routing gateway 124 is configured to establish a connection with another device over the packet-switched network 110 and to send and receive messages and other forms of data over the packet-switched network 110. The routing gateway 124 may establish a physical layer connection, as well as perform higher layer functions including routing, forwarding, and other management and control functions, as understood by those skilled in the art. While FIG. 1 shows only one routing gateway 124 forming a connection with the packet-switched network 110, in other embodiments multiple devices (e.g., multiple routing gateways 124) may be included in the CPE 105 for establishing connections to the packet-switched network 110.

As those skilled in the art will appreciate, the routing gateway 124 may include instructions in the form of computer-readable instructions (e.g., software, firmware, etc.) that when executed cause the routing gateway 124 to be configured to communicate with other devices over the packet-switched network 110. In particular, the routing gateway 124 may be configured using any known protocols supported by the packet-switched network 110 for communicating with other devices connected to the packet-switched network 110. For example, the routing gateway 124 may be configured to communicate using TCP/IP, PPP, DHCP, ATM, and other network communication protocols.

Using known network communication protocols, the routing gateway 124 is able to transmit and receive messages to/from other network devices connected to the packet-switched network 110. For example, the routing gateway 124 may send a message requesting access to network services provided by network service providers (NSPs). In response, the routing device 124 may receive configuration information and process the configuration information to be automatically configured for accessing the requested network services, as discussed below.

The customer premises equipment (CPE) 105 may include other devices connected to the packet-switched network 110 through the routing gateway 124. As shown in FIG. 1, the CPE 105 includes a computer 128 connected to the routing gateway 124. The computer 128 may comprise a personal computer, workstation, or any other known computing device capable of communicating with the routing gateways 124.

While FIG. 1 shows one computer 128 connected to the routing gateway 124, one or more computers 128 may be connected to the routing gateway 124. Further, other devices capable of communicating with the routing gateway 124 may be included in the CPE 105. Merely by way of example, the CPE 105 may include one or more internet-protocol capable telephone devices, switches, set-top boxes, appliances, hubs, and other telecommunications equipment.

While FIG. 1 shows only one example of the customer premises equipment 105, those skilled in the art will appreciate that multiple occurrences of customer premises equipment 105 may be connected to the packet-switched network 110 and positioned to be automatically configured for accessing network services, as discussed below. Those skilled in the art will also recognize that the system 100 is not limited to configuring network devices at a subscriber location. The system 100 may be used to automatically configure any type of networking equipment for receiving a network service, provided the equipment is capable of communicating and receiving configuration information using a network communication protocol.

B. Access Connection

As shown in FIG. 1, the CPE 105 is connected to the packet-switched network 110 by an access connection 132. The access connection 132 may include any known connection for communicatively coupling the CPE 105 and the packet-switched network 110. For example, the access connection 132 may comprise a digital subscriber line (DSL), a fiber-to-the-premises (FTTP) line, a fiber-to-the-node (FTTN) line, a standard telephone line, a cable television line, a wireless connection (e.g., satellite television or cellular connections), and other known connections for providing the CPE 105 with access to the packet-switched network 110.

Examples of DSL and FTTP embodiments of the system 100 will be discussed below. However, the system 100 may be implemented over any known type or types of access connections and is not intended to be limited to the FTTP and DSL embodiments disclosed herein.

C. Packet-Switched Network

The packet-switched network 110 may support any known communications protocols and message formats known to those skilled in the art for packet-switched communications. For example, the packet-switched network 110 may support TCP/IP, ATM, DHCP, PPP, multi-protocol label switching (MPLS), and other known network communication protocols. Any known packet data formats may be transmitted over the packet-switched network 110, including XML messages. Messages may be sent over the packet-switched network 110 in the form of objects as used in object-oriented programming. In one embodiment, the packet-switched network 110 comprises a regional broadband network that supports ATM message format.

The packet-switched network 110 may include any known devices (e.g., routers) for transmitting and receiving messages over the network 110. In FIG. 1, the packet-switched network 110 includes a broadband remote access server (BRAS) 136 for providing devices an interface by which to access the packet-switched network 110. BRAS devices are known to those skilled in the art. The BRAS 136 can provide a platform on which protocol servers (e.g., PPP servers) may reside. The packet-switched network 110 can also include an access device 138 for establishing the access connection 132 with the CPE 105. The access device 138 may include any known device for providing access to the packet-switched network 110, including, but not limited to, an edge router, digital subscriber line access multiplexer (DSLAM), and optical line termination devices. While FIG. 1 shows a single BRAS 136 device and a single access device 138, the packet-switched network 110 may include one or more BRAS 136 devices and access devices 138.

D. Network Service Provider (NSP)

As shown in FIG. 1, the packet-switched network 110 may be connected to the network service provider (NSP) 120. The connection between the NSP 120 and the packet-switched network 110 may comprise any form of connection known in the art. Further, while FIG. 1 shows a single NSP 120, one or more NSPs 120 may be connected to the packet-switched network 110. For example, multiple NSPs 120 may work together to provide routine and advanced network services (e.g., video-on-demand) over the packet-switched network 110. Advanced network services may include video-on-demand, video conferencing, video gaming, broadcast and unicast video, audio (e.g., web radio and compact disc quality audio), dynamic provisioning, image management, security services (e.g., managed firewalls, virus protection, anti-spam features, and parental controls), and other known advanced network services.

The NSP 120 is configured to keep configuration information up to date by providing updated and new configuration information to the directory subsystem 115. As shown in FIG. 1, the NSP 120 may be connected to the directory subsystem 115 by an operation support subsystem (OSS) 140. The NSP 120 may send configuration information to the OSS 140. The NSP 120 may supply the OSS 140 with the configuration information upon request, as triggered by updates to the configuration information, and/or periodically.

E. Operation Support Subsystem (OSS)

The OSS 140 is connected to the directory subsystem 115 and is able to populate the directory subsystem with configuration information received from the NSP 120. In particular, from information received from the NSP 120, the OSS 120 is able to determine an appropriate directory of the directory subsystem 115 into which the configuration information will be stored. The connections between the NSP 120, the OSS 140, and the directory subsystem 115 may be of any form known in the art.

While the OSS 140 is illustrated as a separate entity in FIG. 1, the OSS may be integrated with the NSP 120 or the directory subsystem 115 in alternative embodiments. Further, any suitable communications interface known to those skilled in the art may be employed to establish communication of configuration information between the NSP 120 and the directory subsystem 115.

F. Directory Subsystem

The directory subsystem 115 is a repository of auto-configuration information. The directory subsystem 115 is configured to receive configuration information provided by the NSP 120, store the configuration information, and make the configuration information available to network devices over the packet-switched network 110. The configuration information may be stored in one or more databases according to a specific structure.

In some embodiments, the configuration information is stored according to lightweight directory access protocol (LDAP), which uses a directory information structure (e.g., a directory information tree) that is extensible and thereby allows initial database structure to be extended to include additional fields and/or branches. As known to those skilled in the art, LDAP is a network protocol designed for accessing information in a directory. LDAP devices typically include one or more directories and directory information trees. LDAP comprises an information model defining how information is stored in directories. An LDAP directory supports any type of information, and each entry in the directory typically has a unique name called a distinguished name (DN). The LDAP protocol supports various forms of security including authentication, privacy, and data integrity. The extensibility of LDAP makes is well-suited for storing configuration information.

In other embodiments, other known directory protocols may be used to store and manage configuration information. Any directory protocol that can be accessed, modified, and extended (e.g., X.500 and common open policy service protocol [COPS]) may be used, provided procedures are known for converting between the directory protocol of the directory subsystem 115 and the data format (e.g., XML messages) used by the routing gateway 124 to communicate over the packet-switched network 110.

Although FIG. 1 shows one directory subsystem 115, the system 100 may include one or more directory subsystems 115. In one embodiment, the system 100 includes one directory subsystem 115 per NSP 120, as shown in FIG. 1.

In FIG. 1, the directory subsystem 115 includes one or more directories 144 (144-1 through 144-*n*), at least one directory protocol server 150, at least one message communications server 165, and at least one converter 175, which will now be discussed in detail. However, in alternative embodiments, the message communications server 165 and converter 175 may be located externally of the directory subsystem 115.

1. Directories

Figure 2:
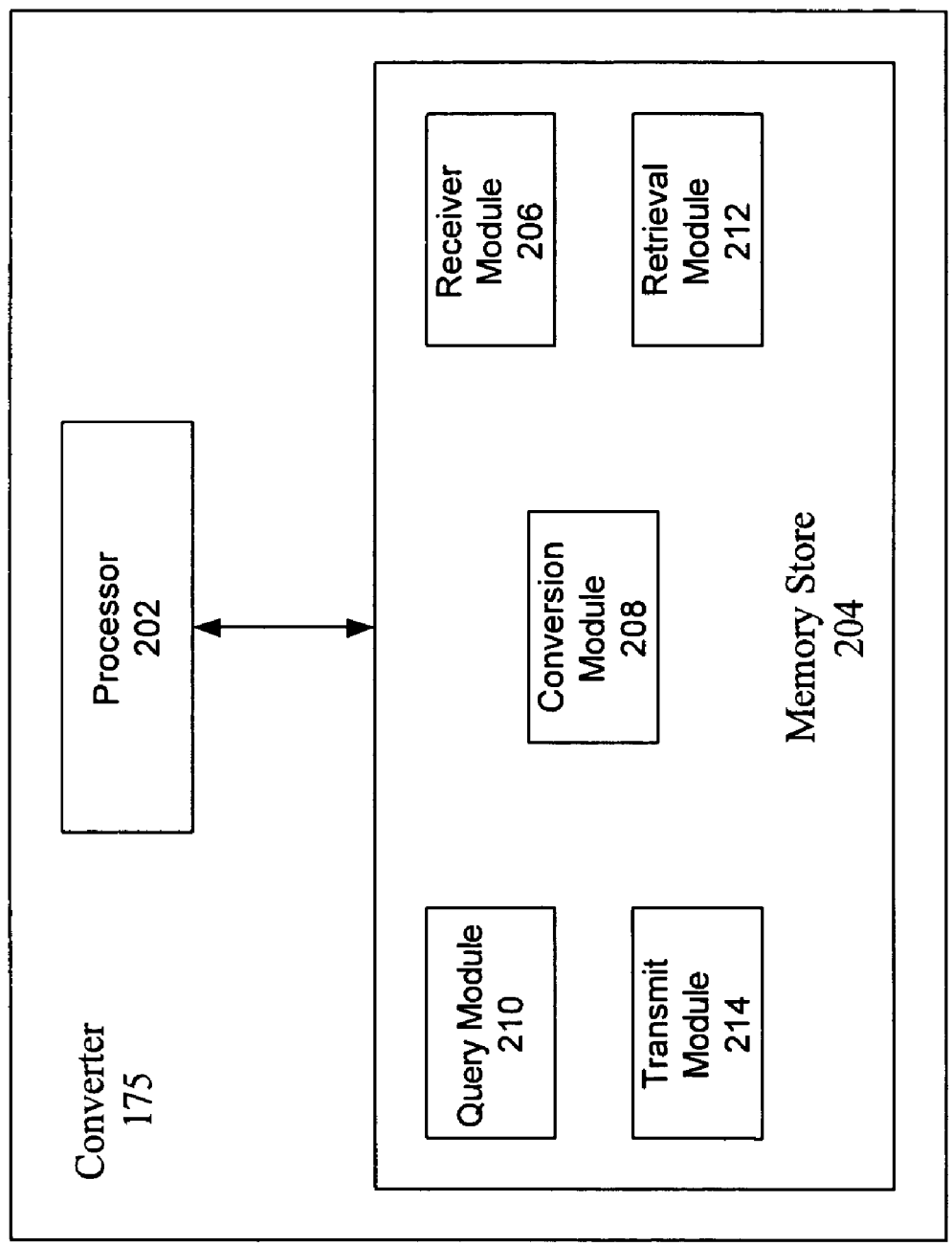
FIG. 2 is a block diagram illustrating the converter of FIG. 1, according to one embodiment thereof.

As mentioned above, the directory subsystem 115 is configured to receive configuration information provided by the NSP 120. The directory subsystem 115 includes one or more directories 144 for storing the received configuration information according to predefined structures. FIG. 2 shows directory 144-1 and directory 144-*n* for storing the configuration information.

The directories 144 may comprise any storage medium or media suitable for storing the configuration information in a manner that enables the information to be searched, accessed, updated, and retrieved. For example, the directories 144 may comprise databases (e.g., relational databases) designed to store the configuration information in directory format. In some embodiments, the directories 144 are configured to support Lightweight Directory Access Protocol (LDAP). However, as mentioned above, other embodiments may employ other directory technologies (e.g., X.500 and common open policy service protocol [COPS]) that allow data to be accessed, modified, and extended.

The directories 144 may store identifications of particular NSPs 120 that are accessible by a particular subscriber, the services that a particular NSP 120 provides, configuration information for accessing the network services provided by the NSPs 120, and any other information useful for auto-configuring network devices for network services. The directories 144 may include configuration information for each network service specific to various types and combinations of routing gateways 124 and other CPE 105.

2. Directory Protocol Server

As shown in FIG. 1, the directory protocol server 150 is in communication with the directories 144. The directory protocol server 150 is configured to access, retrieve, update, delete, search, and/or store information to/from the directories 144. The information stored in the directories 144 is accessible using directory protocol messages to identify entries in a directory structure, such as the directories 144. Directory protocol messages may include search parameters or other attributes for identifying directory entries.

The directory protocol server 150 is configured to use directory protocol messages to access, update, retrieve, and perform other functions on the information stored in the directories 144. In one embodiment, the directory protocol server 150 comprises an LDAP server configured to use LDAP messages to access information stored in LDAP directories according to LDAP protocol. In other embodiments, other known directory protocol messages may be used.

3. Message Communications Server

As shown in FIG. 1, the directory subsystem 115 may include a message communications server 165 in communication with the packet-switched network 110. In FIG. 1, the message communications server 165 is coupled to the BRAS 136 of the packet-switched network 110 using any suitable connection known to those skilled in the art. Network protocol messages may be exchanged between the message communications server 165 and the BRAS 136.

The message communications server 165 is communicatively coupled to the directory protocol server 150 by way of the converter 175. Accordingly, the message communications server 165 and the directory protocol server 150 are able to exchange messages and other information, as discussed below. The message communications server 165 may comprise any known device and/or instructions capable of sending and receiving network protocol messages over the packet-switched network 110 to/from the routing gateway 124 or other network devices.

In one embodiment, the message communications server 165 comprises an XML server, which is well known to those skilled in the art. The XML server is able to communicate with the routing gateway 124 or other network devices by sending and receiving XML messages over the packet-switched networks 110. XML is a communication language that is well known to those skilled in the art for conveying information between network devices.

4. Converter

The converter 175 functions as an interface between the message communications server 165 and the directory protocol server 150. In particular, the converter 175 is configured to convert directory protocol messages to network protocol messages and vice versa. The converter 175 may include any instructions and/or tools known in the art for converting between directory protocol and network protocol languages. In one embodiment, the converter 175 uses known conversion techniques to convert XML messages to LDAP messages and vice versa.

By converting between directory protocol and network protocol languages, the system 100 provides network devices (e.g., the routing gateway 124) access to configuration information in directory format. Because the configuration information can be stored according to directory protocol, the information may be complex and support advanced network services. Accordingly, the directory subsystem 115 supports the automatic configuration of the routing gateway 124 for network services, including advanced network services, by storing and providing access to configuration information. As a result, the routing gateway 124 may be automatically configured for many network services, including advanced network services that are not specific just to a particular network access provided or to a single NSP 120.

The converter 175 may comprise conversion instructions stored on any suitable processor-readable medium. For example, the instructions may be in the form of middleware, firmware, software, and other known forms of processor-readable instructions. The converter 175 may include any devices capable of storing and executing the instructions. In one embodiment, the converter 175 is embodied in a server.

FIG. 2 is a block diagram illustrating the converter 175 of FIG. 1, according to one embodiment. As shown in FIG. 2, the converter 175 may include a processor 202 and a memory store 204. The memory store 204 contains instructions configured to direct the processor 202 to perform steps to facilitate execution of automatic configuration processes, including the configuration process embodiments described below.

As shown in FIG. 2, the instructions may include program modules containing instructions for particular configuration steps. The program modules may include a receiver module 206 for receiving a request from the message communications server 165 for information for configuring the routing gateway 124 to access a network service. In one embodiment, the request is in XML format.

A conversion module 208 includes instructions for converting the received request from a first format to a second format. In one embodiment, the conversion module 208 is configured with instructions for converting an XML message to an LDAP message.

A query module 210 includes instructions for sending a request for the configuration information to the directory protocol server 150. In one embodiment, the query module 210 sends the request in LDAP format.

A retrieval module 212 includes instructions for receiving the requested configuration information from the directory protocol server 150. In one embodiment, the retrieval module 212 receives the configuration information in LDAP format. The conversion module 208 also includes instructions for converting the retrieved configuration information from the second format to the first format. In one embodiment, the conversion module 208 is able to convert LDAP format messages to XML format messages.

A transmit module 214 includes instructions for sending the configuration information to the message communications server 165. In one embodiment, the configuration information is sent to the message communications server 165 in the form of XML messages. The message communications server 165 can send the received configuration information to the requesting network device (e.g., the routing gateway 124) to be used for automatic configuration of the device for a network service.

The converter 175 is not limited to the embodiment shown in FIG. 2. Alternative embodiments may include different software and/or hardware architectures. For example, the memory store 204 may be located externally of the converter 175.

II. DSL Embodiment

Figure 3:
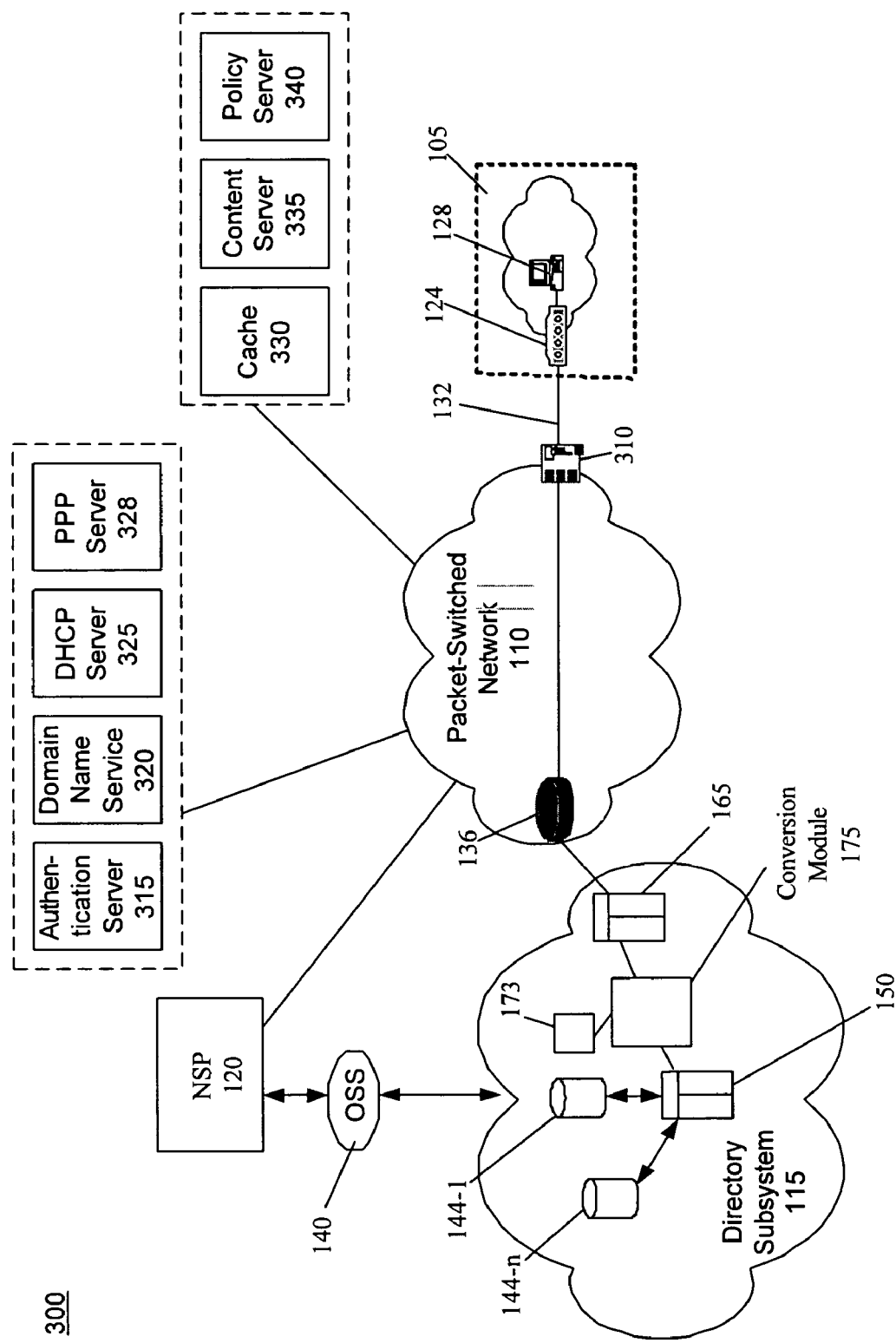
FIG. 3 is a block diagram illustrating another embodiment of the system of FIG. 1.

FIG. 3 is a block diagram illustrating another embodiment. FIG. 3 shows a system 300 similar to the system 100 shown in FIG. 1. In the system 300 of FIG. 3, the access connection 132 is in the form of a digital subscriber line (DSL). The routing gateway 124 connects to a digital subscriber line access multiplexer (DSLAM) 310, which forms a DSL between CPE 105 and the packet-switched network 110. In the illustrated embodiment, the DSLAM 310 is located at a telephone service provider's central office.

FIG. 3 also shows exemplary servers and functions that may be provided over the packet-switched network 110. As shown in FIG. 3, the system 300 may include an authentication server 315, a domain name service (DNS) 320, a DHCP server 325, a PPP server 328, a cache 330 for temporary storage, a content server 335, and a policy server 340 connected to the packet-switched network 110. These devices and their functions are well known to those skilled in the art. Content server 335 may deliver routine or complex services to subscribers over the packet-switched network 110. The policy server 340 may include policies defining the assignment of priorities and bandwidth for the packet-switched network 110. While these servers and functions provided over the packet-switched network 110 are not illustrated in FIG. 1, it is anticipated that the system 100 of FIG. 1 may include any of the devices and/or functions of the system 300 shown in FIG. 3.

III. FTTP Embodiment

Figure 4:
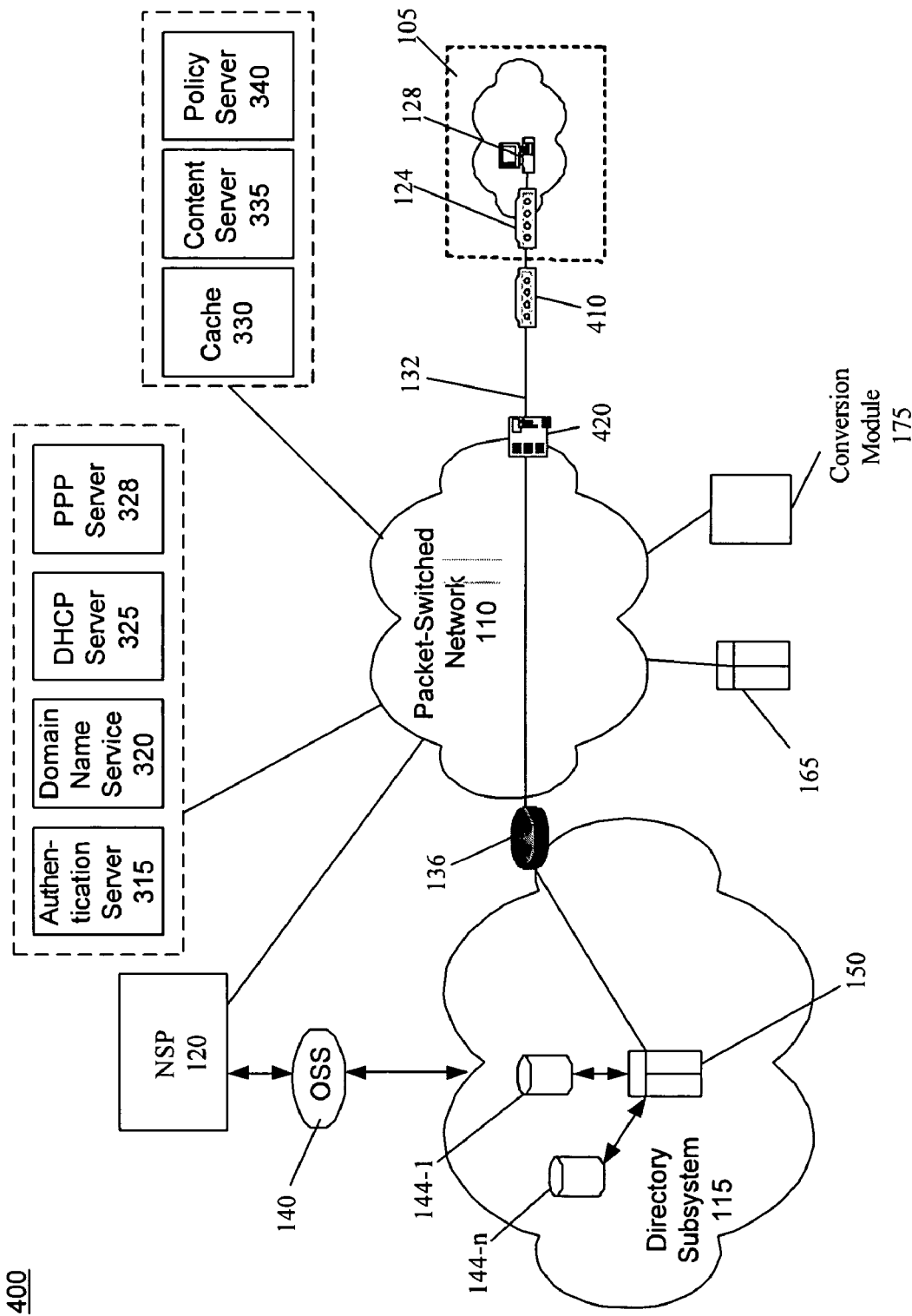
FIG. 4 is a block diagram illustrating yet another embodiment of the system of FIG. 1.

FIG. 4 is a block diagram illustrating a system 400 similar to the system 100 shown in FIG. 1. In the system 400 of FIG. 4, the access connection 132 is in the form of a fiber-to-the-premises (FTTP) line. The routing gateway 124 is connected to an optical network termination (ONT) 410, which may be located at the customer premises. The ONT 410 is connected to an optical line termination (OLT) 420, which may be located at a telephone service provider's central office. The ONT 410 and OLT 420 form a fiber line connection between the routing gateway 124 and the packet-switched network 110 according to techniques known to those skilled in the art.

The system 400 of FIG. 4 illustrates that network architecture is flexible. In particular, the message communications server 165 and converter 175 may be located external to the directory subsystem 115. The message communications server 165, converter 175, directory protocol server 185, and directories 144 can be implemented as separate entities or may be implemented in any combination of distributed and integrated architectures. In some embodiments, these devices may be located in pre-existing network devices.

While FIGS. 3 and 4 illustrate examples of access networks with which the present systems and methods may be implemented, those skilled in the art will recognize that the systems and methods disclosed herein may be implemented for use with other types of known and not yet existing access networks and network configurations. For example, the systems and methods disclosed herein may be implemented using wireless access connections (e.g., satellite television, wireless Internet, and cellular connections), dial-up connections, cable television connections, fiber-to-the-node (FTTN) connections, and other know types of access connections. The present systems and methods are not limited to the architectures shown in FIGS. 1-4.

IV. Process Flow Views

Figure 5:
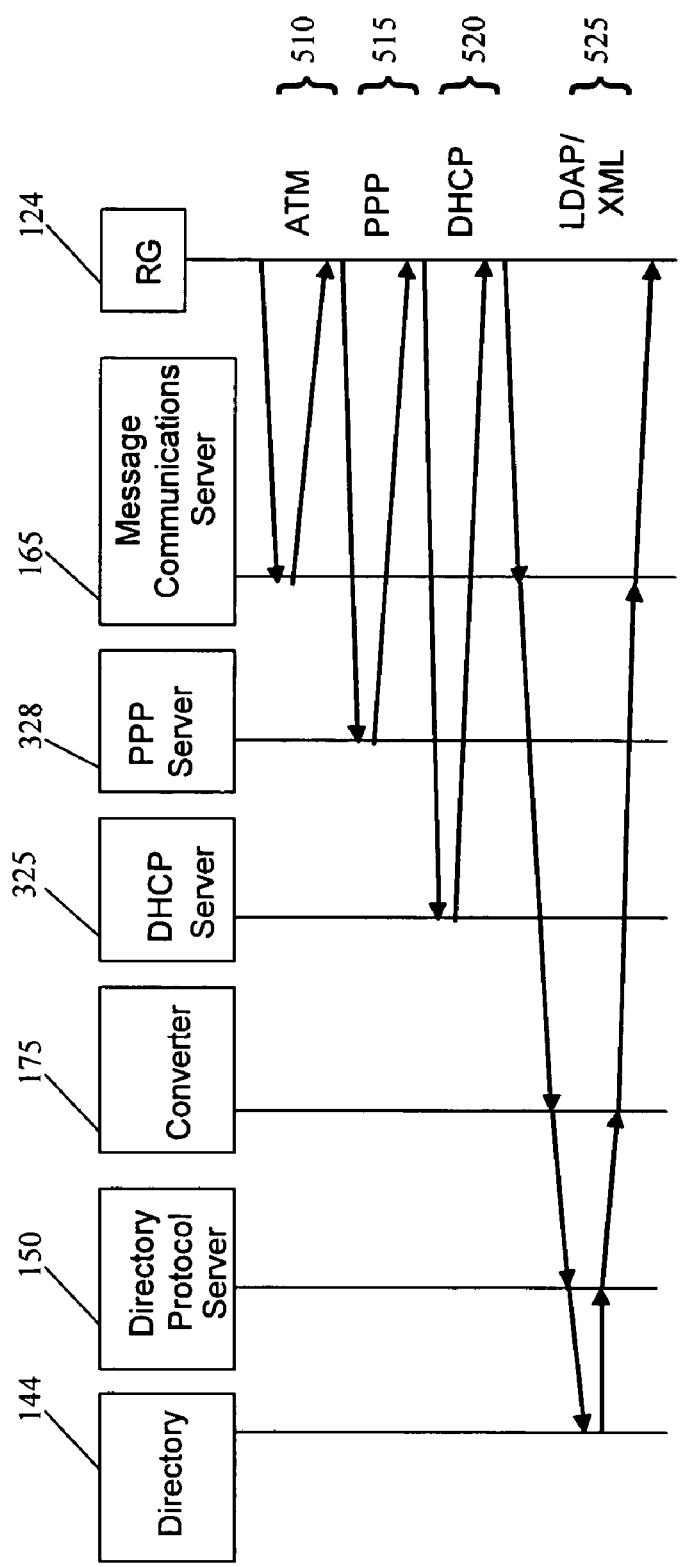
FIG. 5 illustrates an example of an auto-configuration operation using a succession of protocols, according to one embodiment of the system of FIG. 1.

FIG. 5 illustrates an example of an auto-configuration operation using a succession of protocols, according to one embodiment. For the auto-configuration operation shown in FIG. 5, it is assumed that the routing gateway 124 has been loaded with instructions enabling it to establish basic communications, via the packet-switched network 110, with the message communications server 165, the PPP server 328, and the DHCP server 325. As shown in step 510 of FIG. 5, the routing gateway 124 sends a message to the message communications server 165. The message may comprise a configuration request. In response, the communications server 165 sends a message including configuration information for the routing gateway 124. The configuration information may be downloaded into the routing gateway 124 using interim local management interface (ILMI) or other permanent virtual circuit (PVC) assignment mechanisms. In one embodiment, step 510 includes automatically configuring the routing gateway 124 for ATM communications with the message communications server 165, as known to those skilled in the art. Where the message communications server 165 is in the form of an XML server, the ATM configuration process 510 enables communication of XML messages between the XML server and the routing gateway 124 using ATM protocol.

Once the auto-configuration of the routing gateway 124 is performed for the message communications server 165, other network protocols may be used for additional automatic configuration. At step 515 of FIG. 5, the routing gateway 124 sends a message to the point-to-point protocol (PPP) server 328. The message may comprise a configuration request. In response, the PPP server 328 sends a message including configuration information for the routing gateway 124. The configuration information may include authentication and registration information for the routing gateway 124. In one embodiment, the PPP server 328 resides in the BRAS 136, and step 515 automatically configures the routing gateway 124 for communicating with the BRAS 136 using PPP. As a substitute for PPP configuration at step 515, step 515 may be performed using DHCP, a combination of PPP and DHCP, or other known dynamic IP address assignment protocols, as will be understood by those skilled in the art.

Once the auto-configuration of the routing gateway 124 is performed at step 515, other network protocols may be used for additional automatic configuration. At step 520 of FIG. 5, the routing gateway 124 sends a message to the dynamic host configuration protocol (DHCP) server 325. The message may comprise a configuration request. In response, the DHCP server 325 sends a message including configuration information for the routing gateway 124 using DHCP.

Steps 510-520 may be performed using known dynamic configuration processes to establish communications between the routing gateway 124 and other devices connected to the packet-switched network 110. In alternative embodiments, static IP assignment may be used in place of the dynamic IP configurations performed in steps 510-520. With static IP assignment, a device of the customer premises equipment 105 may be assigned a permanent IP address.

Step 525 of FIG. 5 provides enhanced automatic configuration capabilities that are able to support configuration of the routing gateway 124 for advanced network services. As shown in step 525 of FIG. 5, the routing gateway 124 sends messages to the message communications server 165. The message communications server 165 forwards the received messages to the converter 175, which converts the messages from a network protocol format (e.g., XML) to a directory protocol format (e.g., LDAP), as discussed above. The converter 175 then sends the directory protocol messages to the directory protocol server 150, which is able to access the requested configuration information in the directory 144 using known directory protocol messages. The directory server 150 initiates a search request message for querying entries in the directory 144. The search request may include search parameters (e.g., a distinguished name (DN) or other identifiers or attributes) for identifying entries in one or more directories 144.

As discussed above, the directories 144 include configuration information stored as entries that are identifiable by search requests. If a particular entry (e.g., a an entry associated with a particular DN) cannot be located in a particular directory 144, the directory 144 may send referrals to other directories 144 or directory protocol servers 150 using "search result referral" messages.

Once the identified entry is located in the directory 144, information matching the search parameters is returned to the directory protocol server 150. The returned information may be in the form of "search result entry" messages. When the search is complete, the directory 144 in which the information was located sends a "search result done" message to the directory protocol server 150.

The directory protocol server 150 then sends the search results, which are in directory protocol format, to the converter 175 for conversion. The converter 175 converts the search results from directory protocol format (e.g., LDAP) to network protocol format (e.g., XML).

The search results are then transferred to the message communications server 165, as shown in FIG. 5. The message communications server 165 sends a reply message with the requested configuration information to the routing gateway 124. The reply message may be in the form of an XML message, and the configuration information may be presented to the routing gateway 124 in the form of XML language elements. Accordingly, the routing gateway 124 may be automatically configured using a language compatible with the routing gateway 110, even when the routing gateway 124 is incapable of communicating directly with the directory subsystem 115. This allows network devices, including already-deployed network devices, to access and use directory configuration information (translated into network protocol language) for automatic configuration for network services. As a result, network devices are able to access vast amounts of configuration information stored in directory form, including configuration information for advanced network services. Further, deployed network devices can be automatically configured for advanced network services without having to undergo expensive upgrades or retrofits.

The steps shown in FIG. 5 may be initiated ("pulled") by the routing gateway 124. For example, the routing gateway 124 will send configuration requests to other devices when a subscriber initiates procedures for accessing network services. The routing gateway 124 may also be configured to respond to predetermined events by periodically polling the packet-switched network 110 or the directory subsystem 115 for updates and changes in configuration information.

Other network devices may also initiate the steps shown in FIG. 5 to automatically configure the routing gateway 124 periodically, or in response to predetermined events such as an introduction of new network services or updates to network services. The message communications server 165 may periodically "push" updates and changes in configuration information to the routing gateway 124.

The steps shown in FIG. 5 may be executed to provide subscribers with new services that are introduced by one or more NSPs 120. When a particular NSP 120 introduces a new service, the NSP 120 sends the OSS 140 information identifying the new service, configuration information, and identifiers for the network devices (e.g., routing gateway 124) to be configured with the new service. The OSS 140 populates the directories 144 with the information. The directory protocol server 150 sends a message via the converter 175 to notify the message communications server 165 of the new service and the network devices to be configured for the new service. The message communications server 165 then sends messages to the identified network devices. The network devices then initiate the automatic configuration operation shown in FIG. 5 to obtain configuration information for the new services.

Computer-readable instructions for performing the steps shown in FIG. 5 may be stored in one or computer-readable mediums that are accessible by the devices shown in FIGS. 1-4. The computer-readable mediums may be distributed across different devices connected to the packet-switched network and having access to the configuration information stored in the directories 144. Any known form of computer-readable medium may be used to store the instructions.

Figure 6:
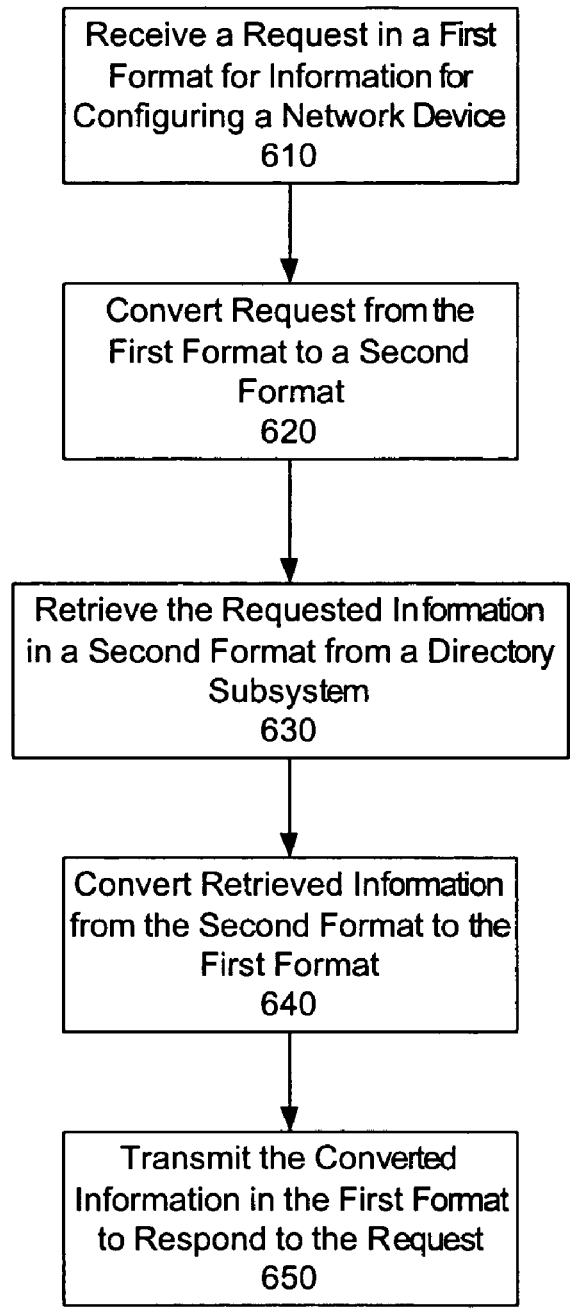
FIG. 6 is a flowchart illustrating a method of facilitating automatic configuration of network devices, according to one embodiment of the system of FIG. 1.

FIG. 6 is a flowchart illustrating a method of facilitating automatic configuration of a network device for network services, according to one embodiment. At step 610, a request for information for configuring a network device is received in a first format. The converter 175 may receive the request, and the request may comprise any network protocol format, including XML.

At step 620, the converter 175 converts the request from the first format to a second format. As discussed above, this may include any conversion from a network protocol format to a directory protocol format, including a conversion from XML format to LDAP format. Predefined mapping heuristics known to those skilled in the art may be employed to translate XML information to LDAP schema.

At step 630, the requested information is retrieved in the second format from the directory subsystem 115. Search messages conforming to directory protocol may be used to locate the requested information in directories 144 of the directory subsystem 115. In one embodiment, LDAP messages are used to search for and access stored configuration information.

Once the requested information is located and retrieved, it is converted from the second format to the first format by the converter 175 at step 640. In one embodiment, the second format is LDAP format, which is converted to the first format (e.g., XML or other communications format). This conversion may be performed using known predefined mapping heuristics for translating LDAP schema to XML information.

At step 650, the converted configuration information is transmitted in the first format to respond to the request. For example, the converter 175 may transmit the configuration information in network protocol format (e.g., XML) to the message communications server 165, which then sends the information to the requesting routing gateway 124 for automatic configuration of the routing gateway 124.

While certain embodiments have been described in which the first message format comprises XML format and the second message format comprises LDAP format, other network and directory protocols may be used. For example, the first message format may comprise any known network communications formats, and the second message format may comprise several different directory protocol formats capable of storing configuration information in an accessible and extensible manner. Procedures and tools known to those skilled in the art may be used to convert between network and directory protocol formats.

The systems and methods described above expand automated configuration processes by providing access to configuration information stored in directory form. The configuration information may include complex information for advanced network services because directory protocols are capable of storing, accessing, and updating such complex information. With an interface to configuration information stored in directories, network devices are able to use a succession of protocols and other communications to gather configuration information. When the capacity of a basic protocol is exhausted, additional messages and protocols may be used until all available configuration information has been acquired for the network services desired by subscribers.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A method comprising:
   receiving an update to information for configuring a network device and an identification of a plurality of network devices intended to receive said update;
   providing said update to a directory subsystem to modify previously stored information for configuring a network device;
   sending a notification in response to said update to at least a subset of said plurality of network devices intended to receive said update;
   receiving a request for information for configuring a network device from a requesting device, said requesting device being one said plurality of network devices intended to receive said update, said request being generated in response to said notification, said request being in a first protocol format, where said first protocol format comprises an extensible markup language (XML) format;
   retrieving said information from said directory subsystem, said information being in a second protocol format and including information from said update, said second protocol format comprises a lightweight directory access protocol (LDAP) format;
   converting said information from said second protocol format to said first protocol format; and
   transmitting said information in said first protocol format to the requesting device in response to said request.

2. The method of claim 1, wherein said retrieving includes:
   converting said request from said first protocol format to said second protocol format;
   sending said converted request in said second protocol format to said directory subsystem; and
   receiving said information for configuring the network device from said directory subsystem in response to said step of sending said converted request, said information being in said second protocol format.

3. The method of claim 1, wherein the requesting device comprises an extensible markup language (XML) server.

4. The method of claim 1, wherein said directory subsystem comprises a lightweight directory access protocol (LDAP) directory.

5. The method of claim 1, wherein said information for configuring the network device is associated with a digital subscriber line (DSL) service, a fiber-to-the-node (FTTN) service, a fiber-to-the-premises (FTTP) service, a dial-up service, or a wireless service.

6. The method of claim 1, wherein said information for configuring the network device is associated with at least one advanced network service.

7. The method of claim 1, further comprising automatically configuring said requesting device using said information.

8. The method of claim 1, wherein the requesting device is a network device located at a customer premises.

9. The method of claim 1, wherein the update is received from a network service provider and includes information for configuring a network device for an advanced network service.

10. A system comprising:
    a directory subsystem configured to:
       store information for configuring a plurality of network devices, the information being stored in accordance with a directory protocol,
       receive an update to at least a subset of the stored information, the update including updated configuration information, and
       send a listing of network devices intended to receive the updated configuration information in response to the update;
    a converter configured to:
       communicate with a network device using a first protocol format,
       communicate with the directory subsystem using a second protocol format, the second protocol format being a directory protocol,
       receive the listing of network devices from the directory subsystem,
       send a notification to at least a subset of network devices intended to receive the updated configuration information,
       receive a request from a requesting device in response to the notification, the requesting device being at least one of the network devices intended to receive the updated configuration information, the request being in the first protocol format,
       convert the request from the first protocol format to the second protocol format,
       send the converted request in the second protocol format to the directory subsystem,
       receive the information for configuring the requesting device from the directory subsystem in response to the converted request, the information being in the second protocol format and including the updated configuration information,
       convert the information from the second protocol format to the first protocol format, and transmit the information in the first protocol format to the requesting device, the information including the updated configuration information.

11. The system of claim 10, wherein the requesting device is a network device located at a customer premises, and the requesting device is automatically configured using the transmitted information.

12. The system of claim 10, wherein the directory subsystem comprises a lightweight directory access protocol (LDAP) directory, the first protocol format comprises an extensible markup language (XML) format, and the second protocol format comprises a lightweight directory access protocol (LDAP) format.

13. The system of claim 10, wherein the information for configuring the network device is associated with a digital subscriber line (DSL) service, a fiber-to-the-node (FTTN) service, a fiber-to-the-premises (FTTP) service, a dial-up service, or a wireless service.

14. The system of claim 10, wherein the information for configuring the network device is associated with at least one advanced network service.

15. The system of claim 10, further comprising at least one network service provider communicatively coupled to the directory subsystem, the network service provider being configured to provide the information for configuring a plurality of network devices to the directory subsystem.

16. The system of claim 15, wherein the network service provider is further configured to:
provide the information for configuring the network device, wherein the information is associated with an access connection and an advanced network service,
wherein the access connection is a digital subscriber line (DSL) service, a fiber-to-the-node (FTTN) service, a fiber-to-the-premises (FTTP) service, a dial-up service, or a wireless service, and
wherein the advanced network service is at least one of a video-on-demand service, a video conferencing service, a video gaming service, an audio service, a radio service, an image management service, and a security service.

* * * * *